(12) United States Patent
VanDerHeyden (10) Patent No.: US 12,223,855 B1
(45) Date of Patent: Feb. 11, 2025

(54) SYSTEM AND DATA STRUCTURE FOR GUIDED LEARNING

(71) Applicant: Education Research & Consulting, Inc., Daphne, AL (US)

(72) Inventor: Amanda M. VanDerHeyden, Fairhope, AL (US)

(73) Assignee: Education Research & Consulting, Inc., Fairhope, AL (US)

( * ) Notice: Subject to any disclaimer, the term of this patent is extended or adjusted under 35 U.S.C. 154(b) by 369 days.

(21) Appl. No.: 17/006,056

(22) Filed: Aug. 28, 2020

(51) Int. Cl.
| G09B 3/02 | (2006.01) |
| G06F 16/901 | (2019.01) |
| G06N 5/01 | (2023.01) |
| G09B 19/02 | (2006.01) |

(52) U.S. Cl.
CPC ........... G09B 3/02 (2013.01); G06F 16/9024 (2019.01); G06N 5/01 (2023.01); G09B 19/02 (2013.01)

(58) Field of Classification Search
CPC ....... G09B 3/02; G09B 19/02; G06F 16/9024; G06N 5/003
See application file for complete search history.

(56) References Cited

U.S. PATENT DOCUMENTS

| 8,798,519 B2* | 8/2014 | Dozier | G09B 5/00 434/350 |
| 9,940,844 B2* | 4/2018 | Gazzaley | H04L 67/10 |
| 10,127,826 B2* | 11/2018 | Rogers | G06Q 50/205 |
| 10,360,809 B2* | 7/2019 | Menon | G09B 7/00 |
| 10,431,113 B2* | 10/2019 | Thomas | G06Q 30/0203 |
| 10,665,120 B2* | 5/2020 | Chikov | G09B 19/00 |
| 10,824,420 B2* | 11/2020 | Collins | G06F 8/10 |
| 10,885,803 B2* | 1/2021 | Brown | G09B 7/00 |
| 11,164,044 B2* | 11/2021 | Goodsitt | G06N 7/005 |
| 11,250,634 B1* | 2/2022 | Goyal | G06N 20/20 |
| 11,321,614 B2* | 5/2022 | Roberts | G06N 5/02 |
| 11,423,091 B2* | 8/2022 | Miller | G06K 9/6256 |
| 2011/0177483 A1* | 7/2011 | Needham | G09B 7/00 434/322 |
| 2012/0164620 A1* | 6/2012 | Needham | G09B 5/00 434/350 |
| 2013/0095465 A1* | 4/2013 | Menon | G09B 7/02 434/362 |

(Continued)

*Primary Examiner* — Xuan M Thai
*Assistant Examiner* — Sadaruz Zaman
(74) *Attorney, Agent, or Firm* — Frost Brown Todd LLP (57) ABSTRACT

A software platform creates and maintains a data structure in the form of a decision tree, with each location or node of the decision tree being associated with certain action steps that are automatically initiated, or are initiated in response to student assessment scores. The "trunk" of the decision tree includes a plurality of screening skills, while a plurality of branches extend outwards from each screening skill, with each branch node being a subsequent skill associated with the screening skill. Entire classes or individual students may traverse the tree based upon periodic time intervals (e.g., weekly assessment of screening skills) and results of prior assessments. Scores indicating mastery of assessed material will traverse the taker towards the trunk, while poor scores will traverse the taker away from the trunk into follow-up assessments. Interfaces are provided for teachers and administrators to monitor progress and generate materials for each node.

18 Claims, 10 Drawing Sheets

(56) References Cited

U.S. PATENT DOCUMENTS

| | | | |
|---|---|---|---|
| 2021/0166477 A1* | 6/2021 | Bunkasem | G06V 10/776 |
| 2022/0114452 A1* | 4/2022 | Gredilla | G06N 3/082 |
| 2022/0300830 A1* | 9/2022 | Kalandyk | G06F 40/35 |

* cited by examiner

Individual Intervention Students

| Name | Class | Skill |
|---|---|---|
| Student D | Class A | Skill A3 |
| Student E | Class B | Skill A5 |
| Student F | Class B | Skill A3 |
| Student G | Class C | Skill A2 |
| Student H | Class D | Skill A2 |
| Student I | Class D | Skill A6 |

426 — Generate Groups    Notify Groups — 428

| Group 1 | Student D | Student F |
|---|---|---|
| Group 2 | Student G | Student H |
| Group 3 | Student E | Student I |

FIG. 8

Progress Summary

- 1st Grade: 2.0 weeks per skill
- 2nd Grade: 3.0 weeks per skill
- 3rd Grade: 2.5 weeks per skill
- 4th Grade: 1.5 weeks per skill
- 5th Grade: 3.0 weeks per skill
- 6th Grade: 3.5 weeks per skill

Classwide Interventions

| Grade | Teacher | Score Recency | Progress | Consistency | WPS | Visit | Scores Increasing? |
|---|---|---|---|---|---|---|---|
| 2 | Teacher 1 | Current | 12/16 | 100% | 2.0 | No | 100% |
| 2 | Teacher 2 | 1 week | 8/16 | 75% | 3.0 | Yes | 85% |
| 3 | Teacher 3 | 2 week | 8/25 | 50% | 3.5 | Yes | 50% |
| 4 | Teacher 4 | Current | 16/20 | 100% | 1.5 | No | 100% |

Recommended Coaching Visit

Teacher 2 — Send Reminder | Schedule Coach Visit | Set Follow Up Reminder

Teacher 3 — Send Reminder | Schedule Coach Visit | Set Follow Up Reminder

Recommended Groups

| Group 1 | Student D | Student F |
|---|---|---|
| Group 2 | Student G | Student H |
| Group 3 | Student E | Student I |

SYSTEM AND DATA STRUCTURE FOR GUIDED LEARNING

FIELD

The disclosed technology pertains to a system and related data structure for providing a guided learning platform.

BACKGROUND

The process of learning new subject matter can be challenging for students even in an ideal scenario. Unfortunately, the ideal scenario rarely occurs in typical classroom settings, and far too often classes will include a mix of students. Some students will master the subject matter quickly while others may take far longer, with the remainder of a class falling somewhere between. With class sizes commonly exceeding 20 students or more in K-12 settings, it is difficult for each student in a class to receive the ideal level of instruction for certain subjects. Students that master subject matter quickly may become frustrated if coursework moves too slowly, while students that require additional time may become frustrated if coursework advances too quickly. These frustrations may not always be apparent to educators, or may instead be perceived as misbehavior or poor effort.

While tools and materials exist to aid educators in classroom settings, they are often inflexible and poorly suited for the individualized needs of students. For example, textbooks or standardized curriculum may include timelines and quarterly learning goals which may work for most students. However, since such materials are static they cannot adapt or be individualized for each student, and may also fail to identify or remedy the root causes of a student's struggles.

Education related software tools exist that may provide a somewhat individualized experience for students, and are often gamified in some way in order to appeal to the student users. However, these tools are typically targeted directly at students (e.g., a mathematic learning game may display basic instructions for a subject matter, and then provide a game interface and experience where successful execution of the subject matter results in a high score and/or victory). As a result, the educator is not involved in the teaching process, and may also be unaware of the results of the game (e.g., gamified learning software often discards the results of student play when the game ends). Such software is not ideal for many students that benefit from personal instruction from a live educator, and also does little to provide the educator insights on student performance that may be leveraged for future work.

What is needed, therefore, is an improved system for guided learning.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

The inventor has conceived of novel technology that, for the purpose of illustration, is disclosed herein as applied in the context of guided learning software. While the disclosed applications of the inventors' technology satisfy a long-felt but unmet need in the art of guided learning, it should be understood that the inventors' technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

Figure 1:
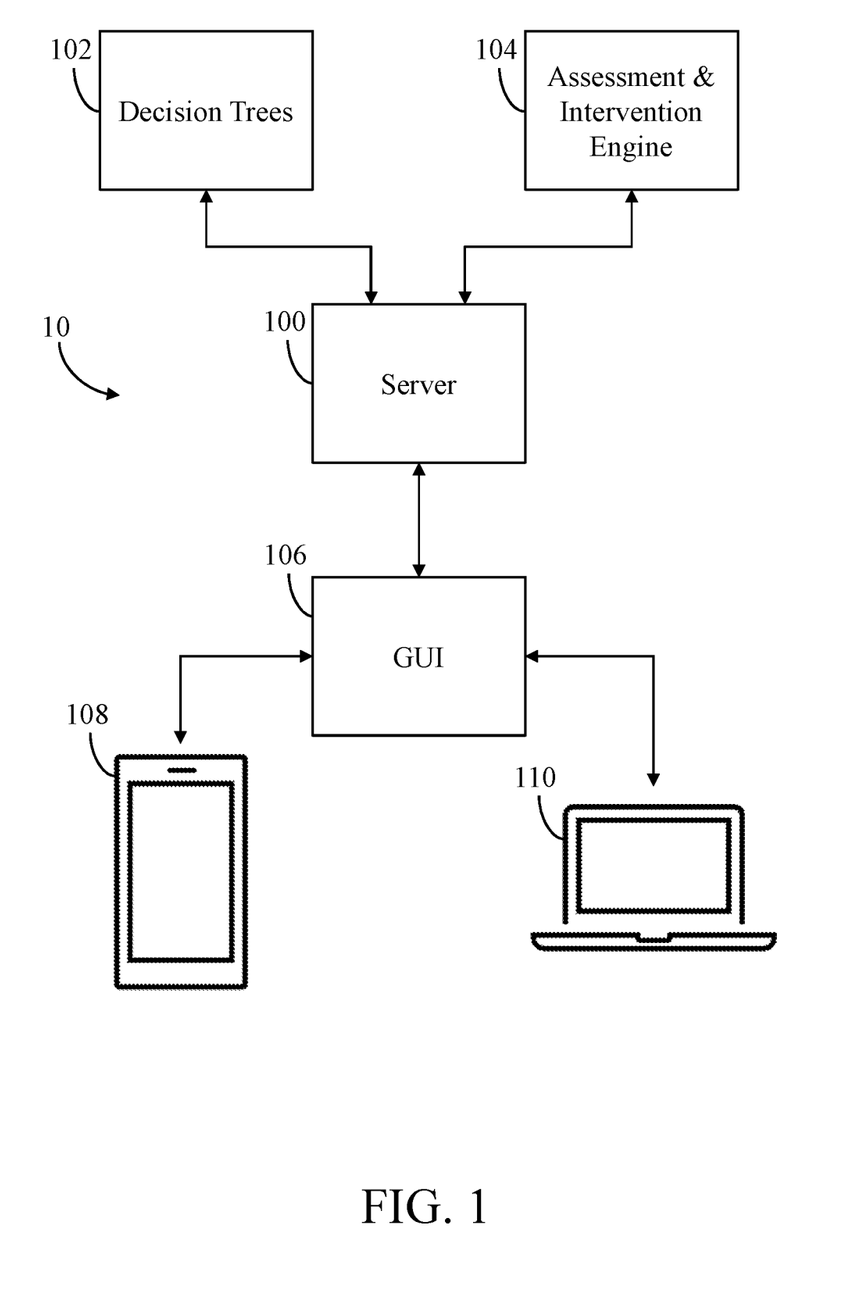
FIG. 1 is a schematic diagram of an exemplary system configured to provide guided learning.

Turning now to the figures, FIG. 1 is a schematic diagram of an exemplary system (10) configured to provide guided learning. A server (100) may include one or more physical servers, cloud servers, or other server or computing environments, and may include one or more processors distributed across such environments. A set of decision trees (102) may be stored in a database or in a computer memory as a collection, set, tree, or other data structure that is capable of expressing the relationship between individual locations on the tree and portions of the tree. As an example, a database may store information that may be accessed by the server (100) and used to build the decision trees (102) in memory where they may be readily accessed during guided learning. The decision trees (102) provide a number of actions that may be performed by or with the aid of the server (100) during guided learning, and the relationship between individual locations of the tree is usable by the server (100) to allow students and classes to traverse between locations of the tree based upon their performance during guided learning, as will be described in more detail below.

The server (100) is also configured to execute and provide an assessment and intervention engine (104), which includes a series of processes that, when executed, will generate customized materials that are usable during guided learning. The server (100) is also configured to provide a graphical user interface (106) to users of the platform. This interface (106) may be, for example, a website, a software application, an interface, or another communication channel that may be utilized by a user device (108, 110), which may be a smartphone, laptop, tablet, or other computing device capable of allowing the user to interact with the interface (106) over a network.

Figure 2:
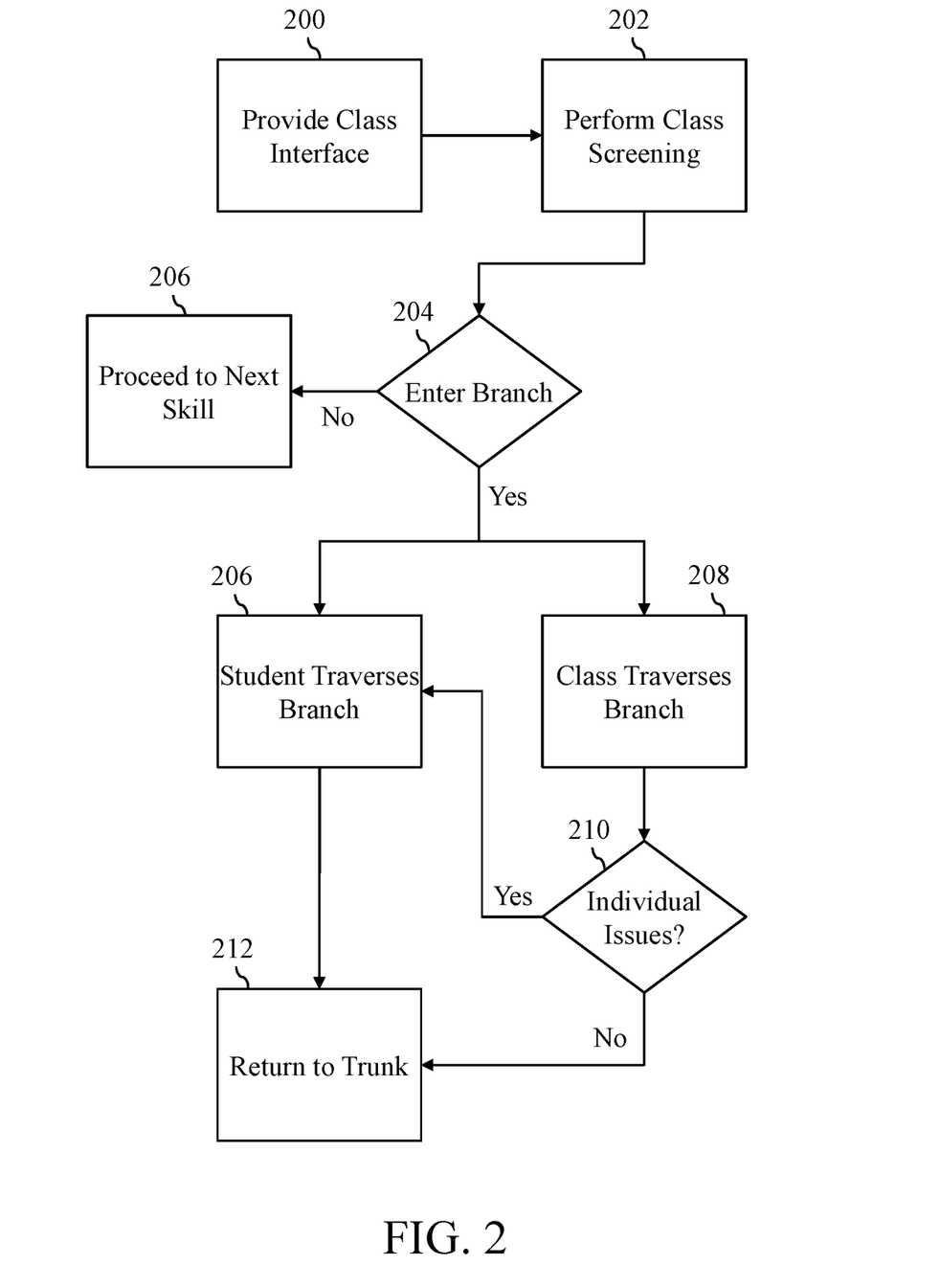
FIG. 2 is a flowchart of an exemplary set of steps that may be performed to provide guided learning for a class of students.

FIG. 2 is a flowchart of an exemplary set of steps that may be performed to provide guided learning for a class of students. A class interface may be provided (200) to an administrator or educator of a class of students as part of the interface (106). In addition to providing basic information such as the names of students in the class, the class interface may also provide a number of indications throughout a school year that a screening assessment should be performed for a class, and may also be used to generate screening assessment materials, as will be described in more detail below. In some implementations, the number and type of screening assessments will correspond directly to portions of a decision tree (102) for that particular grade. A particularly effective way to conduct screening assessments is for the class interface to produce digital files (e.g., PDFs or other electronic documents) that may be printed by an educator and given to students to complete with a pencil or pen. The completed assessment may be graded by the educator to produce a score (e.g., number of questions correctly answered, number of correct digits in each answer, or another metric) which may be provided to the system via the class interface. In this manner, the educator and students may benefit from the guided learning provided by the platform while the educator remains the primary point of interaction with students.

Based upon the results of class screening (202), the system will determine (204) whether a particular branch of a decision tree should be entered. While a structure of the decision tree will be discussed in more detail below, it may be helpful to visualize a plurality of screening assessments as a "trunk" of the tree, with each screening assessment of the trunk leading to a multi-level branching path that may be traversed by entire classes or by individual students depending upon the scores from various screening assessments and sub-assessments. Where scores of a screening assessment are above a threshold configured for each particular screening assessment, the system will traverse (206) the class to a next screening skill (e.g., remaining on the "trunk" of the tree), and a subsequent class screening may be performed (202) on the next skill within several weeks.

Where a substantial number of students in the class (e.g., between about 40% and about 60%) produce assessment scores that are below the threshold, the system will traverse (208) the entire class to a first branch of that screening skill, which will typically be a sub-skill that is related to the more general screening skill (e.g., where a screening skill is 2-digit numbers multiplied by 2-digit numbers, a sub-skill may be 2-digit numbers multiplied by 1-digit numbers).

Where the class as a whole performs well on the assessments screening, such that class intervention (208) is not needed on that skill, one or more students may instead traverse (206) to a first branch of the screening skill. The decision trees (102) that are traversed by classes (208) and by individuals (206) may be the same decision trees, or may be different decision trees (e.g., a decision tree for 2-digit by 2-digit multiplication for an entire class may have a different structure than that traversed by an individual within the class).

Where an entire class is traversing (208) a branch of the decision tree, subsequent assessments on the screening skill may result in the classwide intervention ending (e.g., such as where the scores for most of the class rise above the threshold for intervention). In such cases, individual students that are still experiencing issues (210) may be routed to individual traversal (206) of the decision tree, as has been described. Where no issues exist (210), or where individual traversal (206) of the tree results in subsequent scores that are above a threshold indicating mastery of the skill, the individuals or the class may traverse and be returned (212) to the trunk of the decision tree, such that they will be assessed on a different screening skill in the subsequent weeks. While some portions of the guided learning process require manual intervention by educators (e.g., printing and providing assessments to students, entering student scores into the system) and students (e.g., completing assessments), the traversal of the decision trees (102) is entirely automated, and causes the interface (106) to automatically change and update such that the educator is always provided with the specific materials and tools that are needed for a particular location that a class or individual is on the decision tree (102). These features and other advantageous features of the disclosed system will be described in more detail below.

Figure 3:
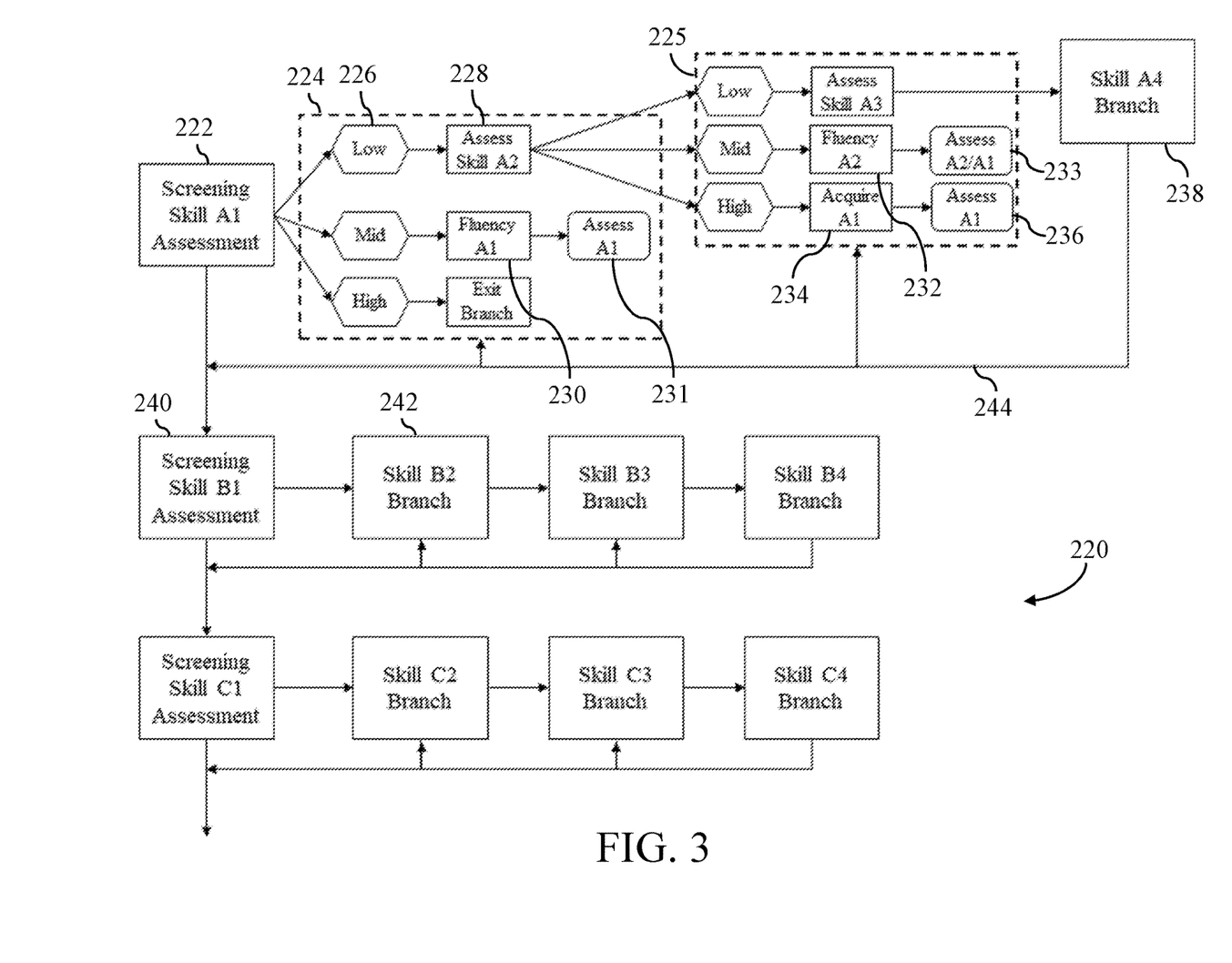
FIG. 3 is a schematic diagram of an exemplary data structure that may be used during the steps of FIG. 2.

FIG. 3 is a schematic diagram of an exemplary data structure that may be created and managed by the system to provide traversable decision trees (102). Screening skill assessments (e.g., the "trunk") are shown to the left, including a skill A1 assessment (222), skill B1 assessment (240), skill C1 assessment, and so on, with the number of screening skills varying per grade level. Each screening skill branches off to the right to include a set of branches or sub-skills, such as a skill A2 (224), skill A3, skill A4 (238), skill B2 (242), and so on, with the number of branches or sub-skills varying per grade level and per trunk skill (e.g., skill A1 (222)). An entire class or an individual student may traverse outwards along the branches (e.g., skill A1 to A2, A2 to A3, A3 to A4) based upon score results from assessments, and may also traverse inwards towards the trunk one branch at a time (e.g., skill A4 to A3, A3 to A2) or directly (e.g., A4 to A1), again depending upon the score results that are entered into the system after assessments.

The branches for skills A2 (224) and A3 are shown in more detailed form, though it should be understood that each branch may have similar contents. Entry into the skill A2 branch (224) begins with a range determination (226) of the score from the A1 assessment (222). Ranges are represented as high, mid, and low, though the particular score ranges will vary and may be configured based upon the particular assessment (e.g., ranges may cover equal distributions of scores, but are not required to do so). A high score range will indicate that the student has at least partially mastered the assessed skills (e.g., in some cases a general skill such as A1 may be assessed in combination with a sub-skill such as A2), and will typically result in a traversal (244) partially or fully back to the entry point. In the case of the branch A2 (224), a high score will exit the branch and return to the trunk since the A1 skill has been mastered, such that the next traversal will be to screening skill B1 (240).

A mid-range score will indicate that the student, or class, has acquired the assessed skill but must still build fluency in order to master it. In response, the system will automatically generate materials and provide interfaces to provide an instructional script for fluency building for skill A1 (230), as well as an assessment for skill A1 (231) that will reassess the progress towards mastering skill A1 after fluency building.

A low range score will indicate that the student, or class, has not acquired the basics of the assessed skill. In response, the system will automatically generate an assessment (228) for a subsequent skill (e.g., skill A2 branch (225)), with the results of that assessment feeding into the A3 branch (225) and traversing that branch similarly as described above in the context of the A2 branch (224).

The skill A3 branch (225) and subsequent branches that are not immediately adjacent to the trunk may have different response characteristics for the skill ranges. For example, the A3 branch (225) includes a similar response for a low range score (e.g., assessment of the subsequent skill A3 and traversal to the A4 branch (238)), but has a different response for mid and high range scores. Mid-range scores result in materials being produced and an interface being provided for fluency building instruction for skill A2 (232) and an assessment of the target skill A2 as well as the general skill A1 (233). Results of this assessment may cause traversal back to branch A2 (224) or, if the skills indicate mastery of the general skill A1, traversal back to the trunk and then to skill B2 (240). High range scores result in materials being produced and interfaces being provided for acquisition instruction of skill A1 (234) and an assessment of the general skill A1 (236). Branches may extend outwards from the trunk a variable number (e.g., the skill A1 may have branches A2 through A20), and the trunk itself may extend downwards a variable number (e.g., to a screening skill Z1), depending upon the particular subject matter, grade level, and other factors, with the particulars of each decision tree being configured by an educator.

With reference to FIG. 3, each screening assessment or "trunk" portion (e.g., screening skill A1 (222)) and each skill branch (e.g., skill branch A2 (224)) may be referred to generally as a node, or more specifically as a trunk node, screening node, branch node, or skill node.

Figure 4:
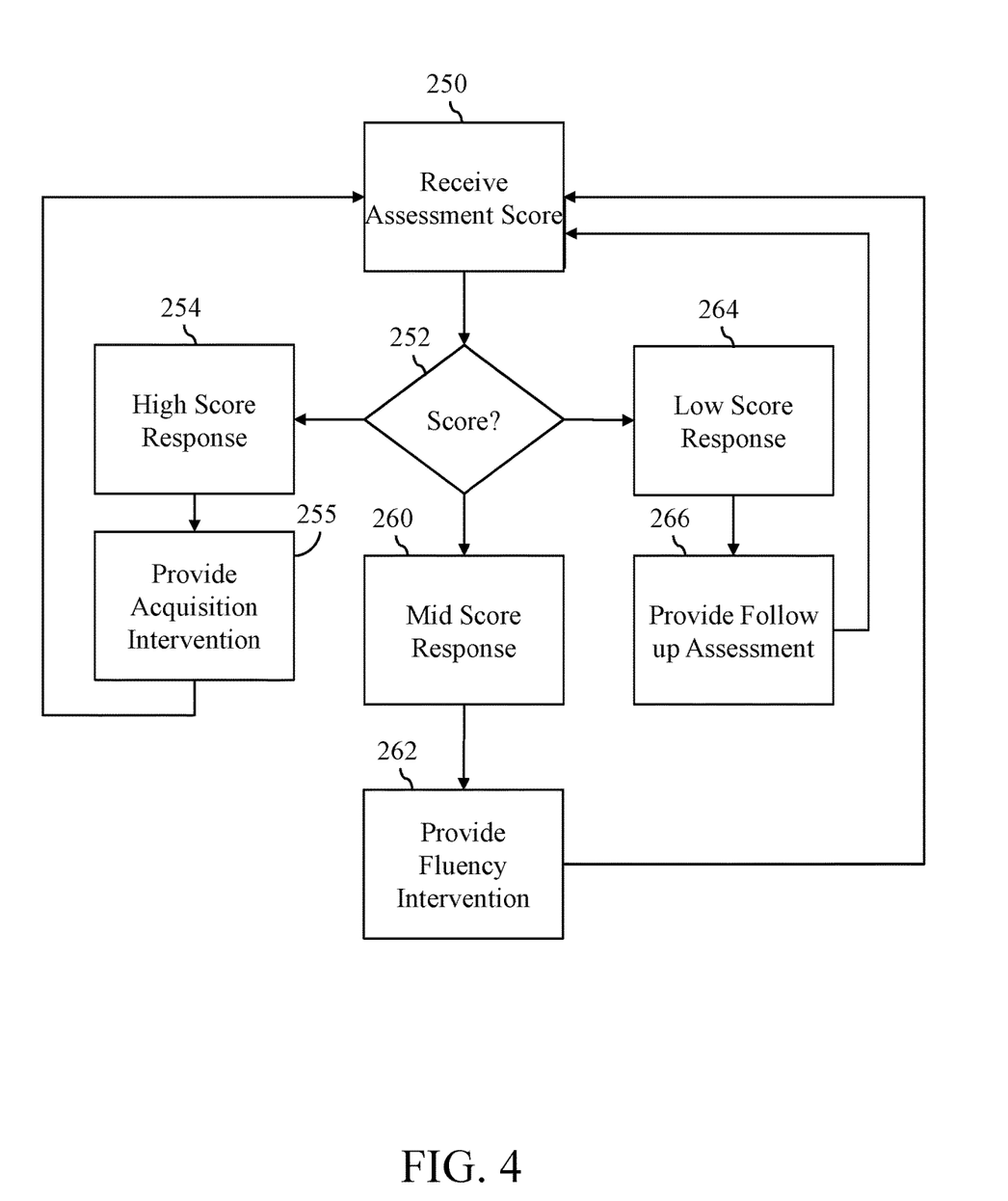
FIG. 4 is a flowchart of an exemplary set of steps that may be performed to traverse the data structure of FIG. 3.

FIG. 4 is a flowchart of an exemplary set of steps that may be performed to traverse the data structure of FIG. 3 in response to the results of an assessment (e.g., either a screening assessment such as A1 (222) or a sub-assessment from the A2 branch (224)). After an assessment score is received (250), the system may evaluate (252) the score and determine the range that it falls within, as described above. In response (254) to a high score, the system may provide (255) materials and interfaces for acquisition and assessment of a prior skill (e.g., which, in the case of mastery, results in traversing one branch back towards the trunk) and, in some cases, the general skill (e.g., which, in the case of mastery, results in traversing immediately back to the trunk).

In response to a mid-range score (260), the system may provide (262) materials and interfaces for fluency building and assessment for the present skill and, in some cases, the general skill, with the results of such assessment subsequently being received (250) by the system for further traversal. In response to a low-range score (264), the system may provide (266) materials and interfaces for a follow up assessment of and traversal to a subsequent skill branch.

Figure 5:
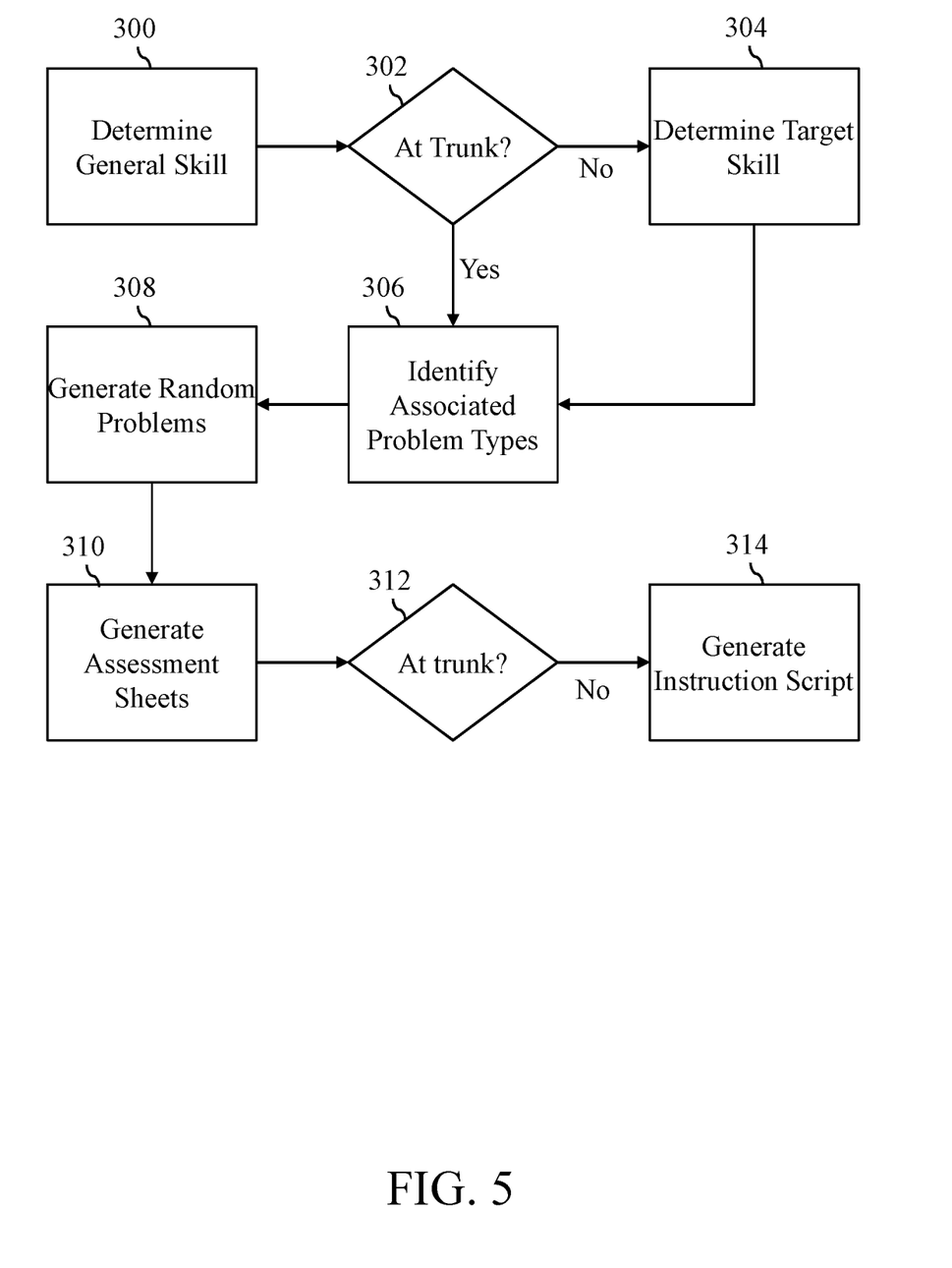
FIG. 5 is a flowchart of an exemplary set of steps that may be performed to generate materials usable during guided learning.

FIG. 5 is a flowchart of an exemplary set of steps that may be performed to generate materials usable during guided learning. Materials, whether for instruction or assessment, may be generated automatically upon traversal between or within branches of a decision tree, or may be automatically generated in response to a user input such as a selection of a button or other element of the interface (106). In either case, when generating materials, the system may determine (300) what the associated general skill is (e.g., the screening skill, such as skill A1 (222) or B1 (240)). If the student or class is currently at the trunk, there will be no target skill yet since the target skill will be a sub-skill of the general skill (e.g., A2, B2). Where traversal has occurred away from the trunk, the current target skill will also be determined (304). The system may then identify (306) one or more problem types associated with the determined (300, 304) skills. Problem types may be stored in any structured form in a database or other repository, and may be stored as information that defines the general structure of an associated problem with variables in place of integers (e.g., a problem type for 2-digit by 2-digit multiplication might be stored as XY*AB). The system may then generate (308) a configured number of random problems using the identified (306) problem types, continuing the previous example, random integers may be plugged in for the variables such that XY*AB becomes 12*34).

A set of assessment sheets may then be generated (310) that contain each of the randomly generated (308) problems spaced apart and with sections for students to show their work and provide an answer. The assessment sheets may be produced in any digital file format that can convey text and/or images, such as PDF, DOC, JPG. In some implementations, generation (310) of the assessment sheets may also include automatically sending data to a networked printer to cause the assessment sheets to be printed. This may also include using data stored and associated with the educator user of the platform and/or the class associated with the guided learning to identify a particular printer to print from (e.g., a printer in that educator's classroom), a number of assessments to print (e.g., based upon the number of students in a classwide intervention, or based on a number of students in individual intervention), or a particular student name or identification number to place on each of the printed assessments.

Where the student or class is currently not at the trunk (312), the system may also generate (314) an instructional script to be paired with the generated assessment. As previously described, scripts may be used to provide instruction prior to an assessment, and in some implementations the material provided as part of the script may be targeted at fluency building of nearly mastered skills, or acquisition of new skills. As with the generated (310) assessments, the generated (314) instruction script may be automatically printed to certain locations and customized in various ways. While the instructional content of the script may be statically configured by an educator, customized aspects may include descriptions of students past scores and goal scores for subsequent assessment, may include sections or questions targeted at specific students by name, or may include other dynamic customizations.

Figure 6:
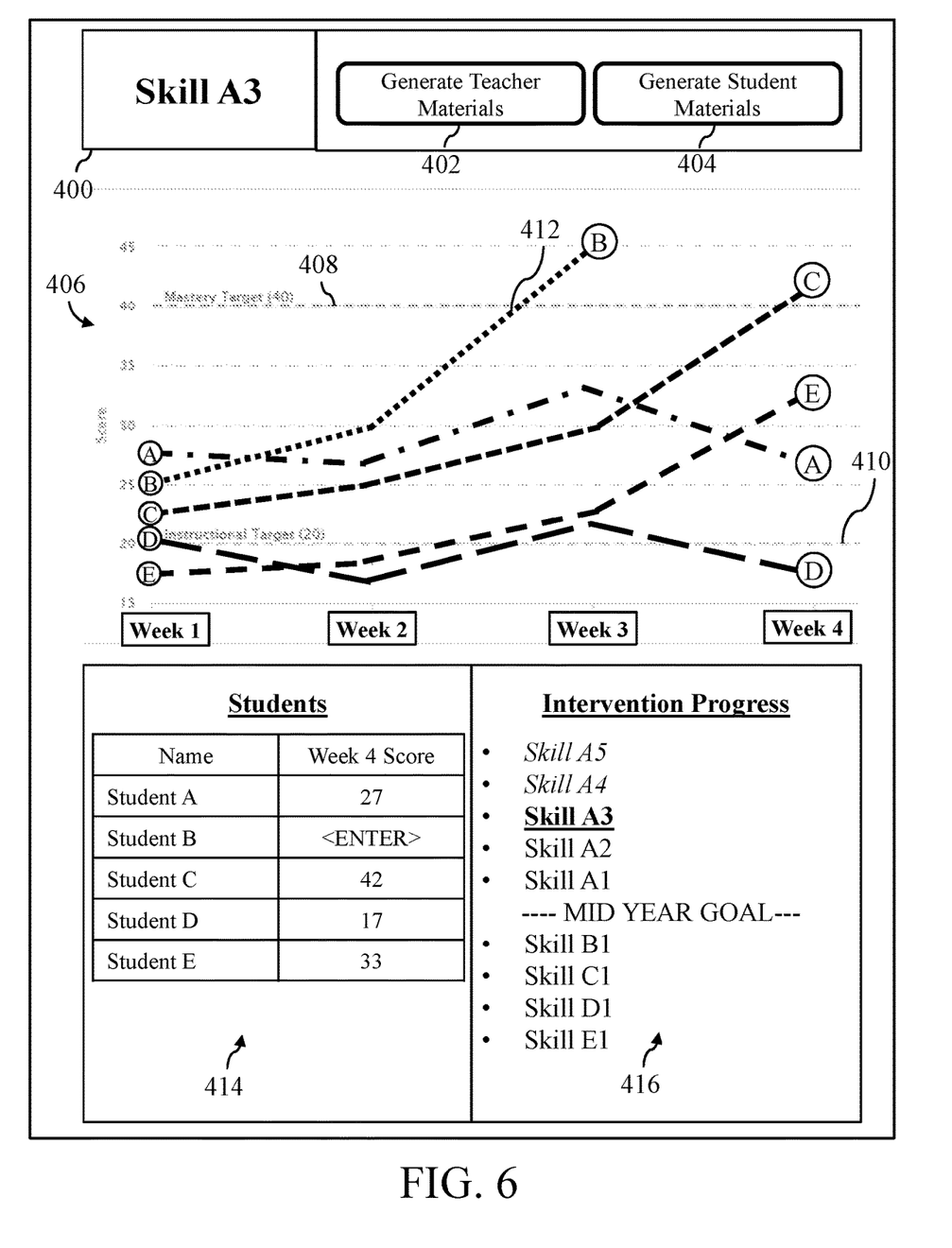
FIG. 6 illustrates a class intervention interface that may be displayed during guided learning.

FIG. 6 illustrates a class intervention interface that may be displayed during guided learning. The class intervention interface may be displayed to an educator after a screening skill assessment (e.g., such as skill A1 (222)) resulted in a classwide traversal into skill A2 branch (224) or beyond. A skill identifier (400) may identify the skill branch that the class has currently traversed to. A set of material generation buttons (402, 404) may be provided that an educator may interact with to generate new sets of instructional materials and scripts, or new sets of student assessment materials, or both. A graph (406) shows weekly progress of the students participating in the classwide intervention. Score targets may be shown on the graph (406) that indicate the score range, with scores below an instructional target (410) corresponding generally to low-range scores, scores between a mastery target (408) and instructional target (410) corresponding generally to mid-range scores, and scores above a mastery target (408) corresponding generally to high-range scores, as previously described. Each student, such as a student B (412), may be represented on the graph (406) in varying colors, patterns, or other visually distinctive features, with their weekly scores relative to the shown ranges.

From the graph (406), it can be seen that the class has been participating in a classwide intervention on skill A3 for 4 weeks, which may include several rounds of acquisition and/or fluency instruction and subsequent assessment. Use of the materials buttons (402, 404) will automatically generate materials appropriate for acquisition and/or fluency building of skill A3. A score submission area (414) may be used by the educator each week to enter the assessment scores for each student for that week. As can be seen, the week 4 score for student B (412) has not been entered yet, and so the graph (406) has yet to update for that student. An intervention timeline (416) is also displayed, showing a sequence of skills that the class is likely to traverse, with skills that have already been mastered (e.g., skill A5, skill A4) being visually distinct from the current target skill (e.g., skill A3) and subsequent skills (e.g., skills A2, A1, B1, etc.). The intervention timeline (416) may show additional information, such as quarterly goals or dates, estimated dates when each skill may be mastered (e.g., based upon the classes historic average number of weeks to master a skill), or other information. While the decision trees (102) are not visible from the intervention interface, the correspondence between structure and traversal of the tree and the current skill (400), material generation (402, 404), and intervention timeline (416) is apparent.

Figure 7:
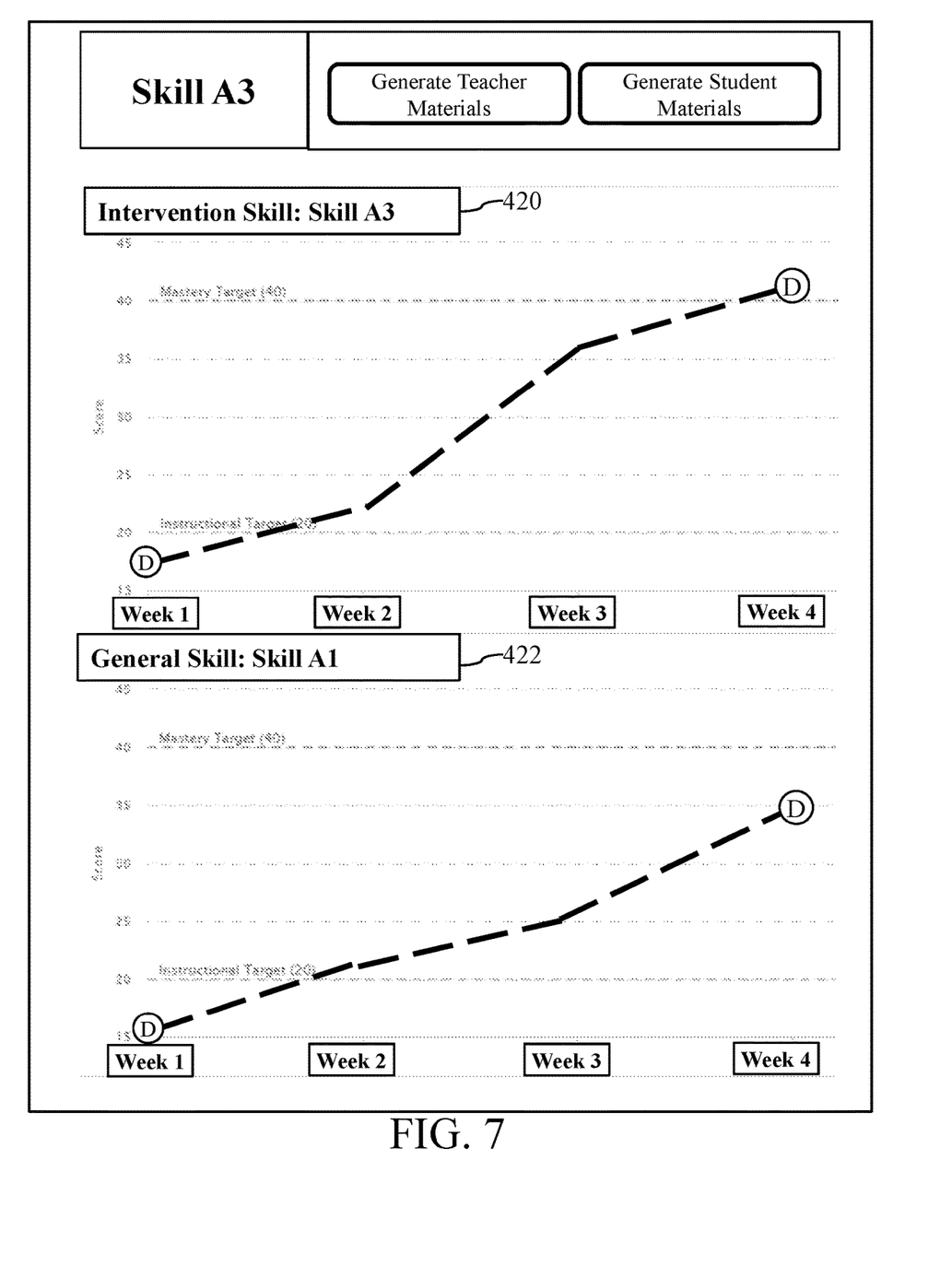
FIG. 7 illustrates an individual intervention interface that may be displayed during guided learning.
Figure 8:
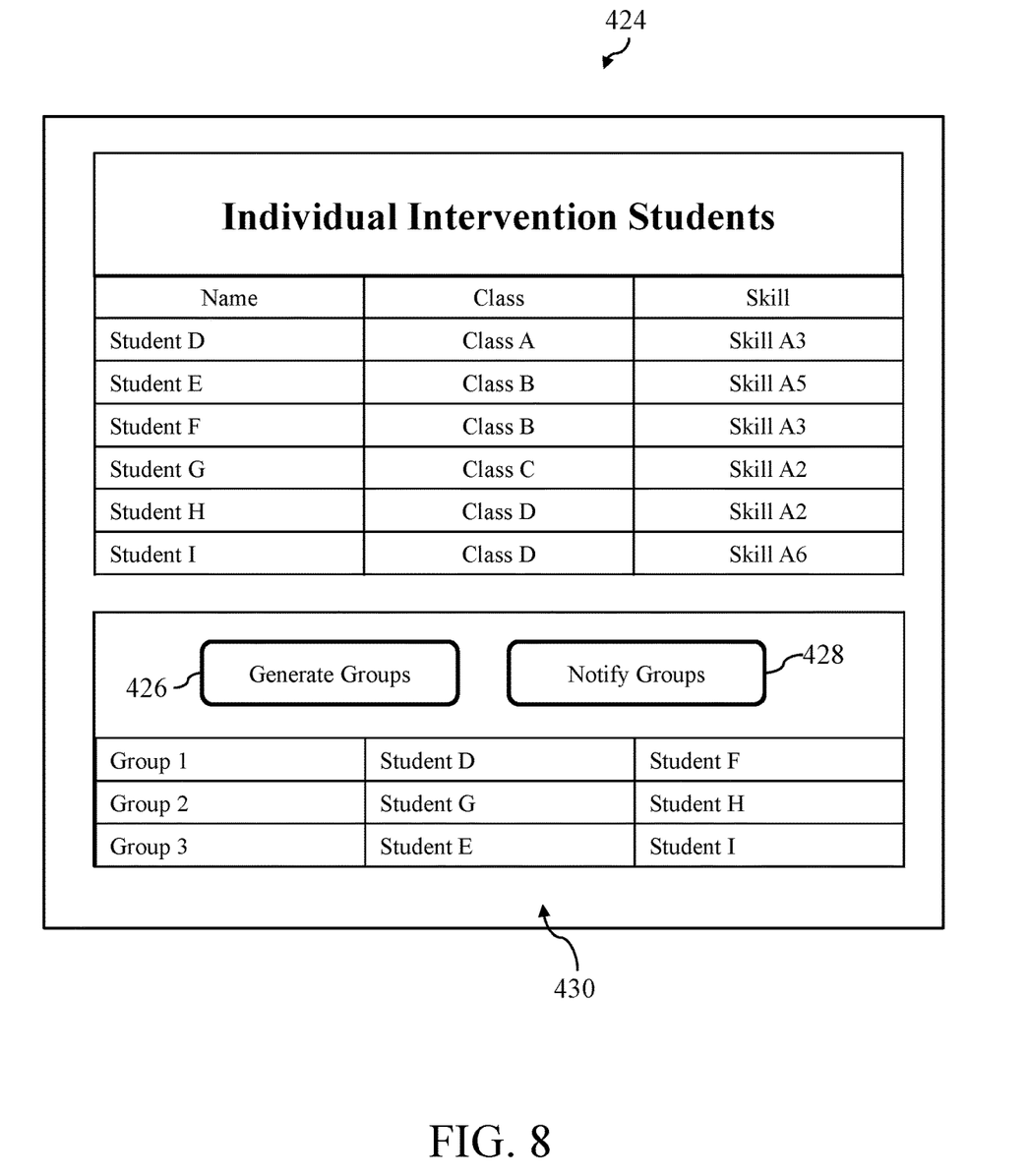
FIG. 8 illustrates an individual intervention grouping interface that may be displayed during guided learning.

FIG. 7 illustrates an individual intervention interface that may be displayed during guided learning. As has been described, individual intervention may occur when classwide intervention is not warranted, or when classwide intervention has completed and some individual students still fall within a frustration range of scores (e.g., low-range) for certain assessments. The individual interface is similar to the classwide intervention interface, and may include more detailed information on the individual student. For example, FIG. 7 shows separate graphs for an intervention target skill, A3, and the general skill, A1.

Where an educator has a number of students participating in individual interventions, the interface may additionally show the interface of FIG. 8, which illustrates an individual intervention grouping interface. The intervention grouping interface shows a list (424) of all students currently participating in individual interventions across a certain grade level (e.g., 2nd grade, 3rd grade), and may extend beyond an individual teacher's classroom. Controls may be provided that allow a teacher to generate (426) a recommended grouping (430) of individual intervention students such that they can be grouped into pairs for fluency building and acquisition instruction, as well as for assessment completion. The interface may also include a button usable to notify (428) the groups, which may cause an electronic communication to be sent to the classroom teacher notifying them of the grouping, or may be sent to the student themselves (e.g., a notification may be sent to the teacher of class B indicating that Student E has been paired with Student I, and that Student F has been paired with Student D). The recommended grouping (430) list may be automatically generated based upon the current skill each student is working on, the class that each student is in, or other factors that may be available to the system such as student schedules or preferences.

Figure 9:
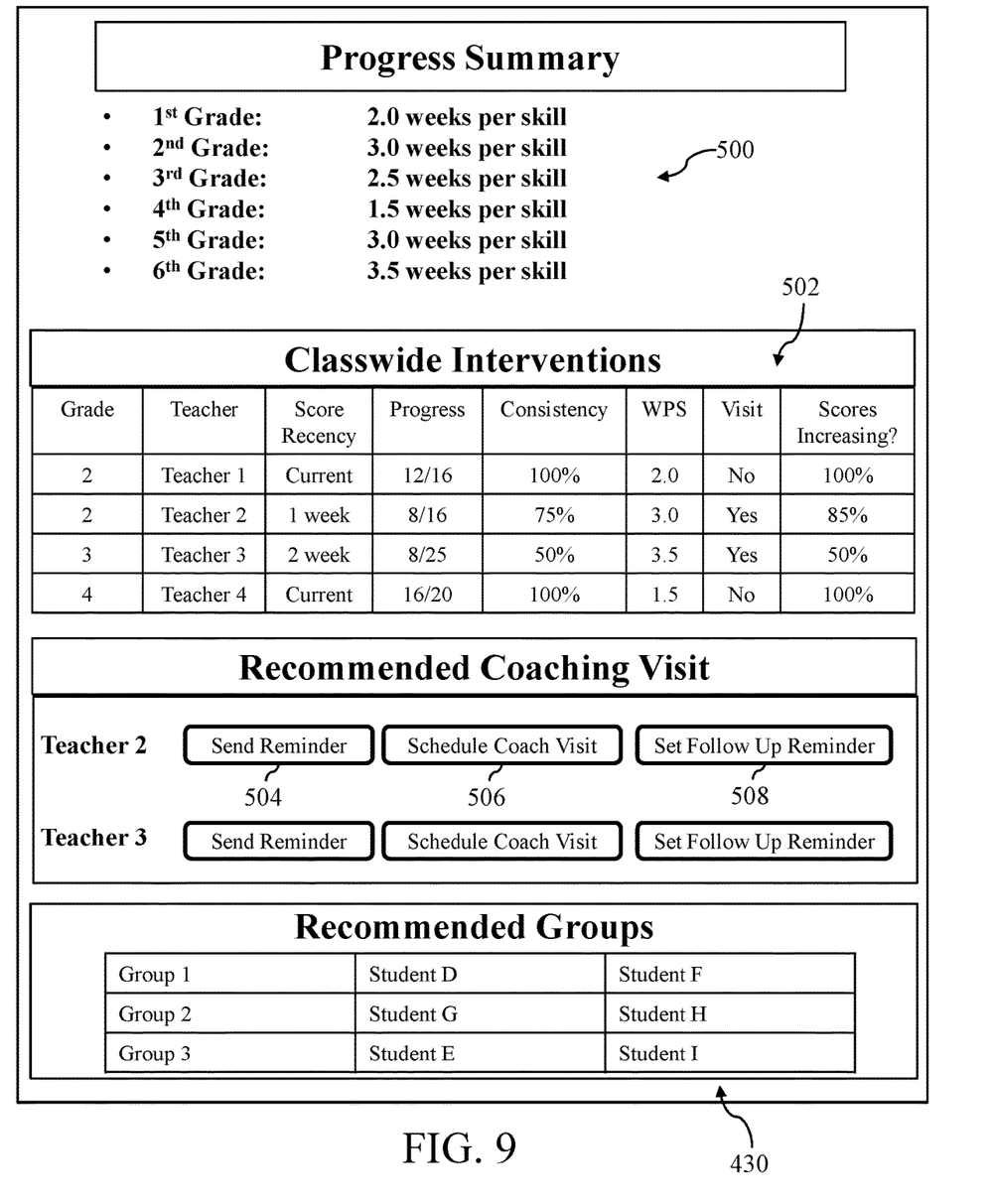
FIG. 9 illustrates a learning coach interface that may be displayed during guided learning.

FIG. 9 illustrates a learning coach interface that may be displayed during guided learning. The learning coach interface is intended to be used by principal or other administrator of a school in order to develop an understanding of the use of the guided learning platform across an entire school. A grade average area (500) shows the average number of weeks that it takes each grade level to master a skill (e.g., traverse from skill A3 back to skill A2). A classwide intervention area (502) shows the grade level and teacher for each class that is currently participating in an intervention.

A score recency column shows the number of weeks since assessment skills were last provided for a class. Ideally, assessment scores should be entered every week, so a score recency of 1 week or more may indicate a problem. A progress column shows the number of skills that the class has mastered, and how many skills remain, and may generally correspond to the intervention timeline (416) for each class. A consistency column shows the percentage of weeks that a score was entered for assessments. A 100% consistency indicates every week, while 50% would indicate that a score was entered for 5 weeks out of 10, and so on. As with recency, a lower consistency score may indicate a problem. A weeks per skill column shows an average number of weeks that it takes that class to master each skill, which may provide a useful comparison to the weeks per skill metric shown in the grade average area (500). A scores increasing column shows the percentage of students in that class intervention whose scores are increasing each week (e.g., a steady increase in the graph (406) of FIG. 6). A visit recommended column indicates, for each class, whether a visit from the learning coach is warranted. The visit recommended column may be automatically updated by the system on a daily or weekly basis, and the determination may be made based upon other factors such as score recency, consistency, percentage of scores increasing, or other metrics as will be described in more detail below.

Figure 10:
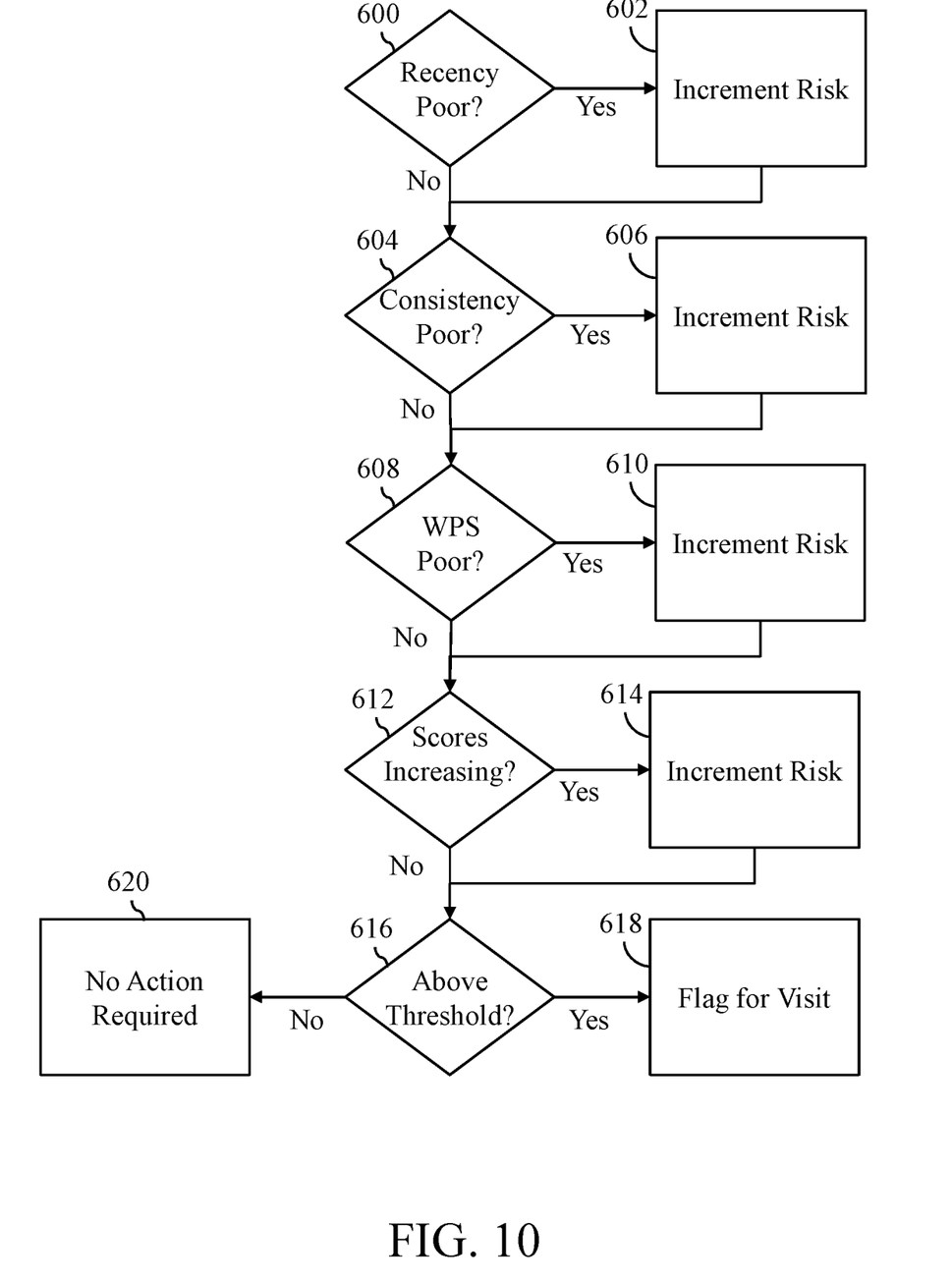
FIG. 10 is a flowchart of an exemplary set of steps that may be performed to identify classes that are not benefitting from guided learning.

A coaching visit section may identify each class for which a coaching visit or some other intervention is recommended. Coaching visits will generally be recommended for classes where the educator in charge of the manual portions of the guided learning platform is not timely or consistent in providing assessment scores and generating instructional materials, or where the class is not showing sufficient progress. In some implementations, buttons may be provided that may be clicked to automatically send a reminder to the educator of that class (504) (e.g., describing an issue with recency and/or consistency and reminding the teacher to promptly present the instructional materials and submit the assessment scores), to schedule a coaching visit (e.g., provide an electronic communication to the teacher with a time and location of a meeting with the learning coach), or to set a follow up reminder (e.g., to check back on the teacher and class progress in a set number of weeks). The learning coach interface may also include a recommended grouping area (430), as described above, such that the learning coach may generate, notify, and coordinate paired groupings of students across an entire school FIG. 10 is a flowchart of an exemplary set of steps that may be performed to identify classes that are not benefitting from guided learning, and may be used as part of identifying a class where a visit may be recommended. The system may regularly evaluate one or more metrics for each classwide intervention. Factors such as poor recency (600), poor consistency, poor weeks per skill, and a low percentage of scores increasing may each result in an incremented risk (602, 606, 610, 614, 618) score or rating. An aggregate score that is above (616) a configured threshold may trigger the learning coach interface to recommend a learning coach visit to the teacher of that classroom, while a score below the threshold will indicate that no action is required (620).

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

The invention claimed is:

1. A guided learning system comprising:
    (a) a server comprising one or more processors;
    (b) a data structure comprising a plurality of screening nodes, wherein:
        (i) each screening node is associated with two or more skill nodes as an origin node;
        (ii) each screening node is associated with a general skill, from among a plurality of general skills, where the general skill associated with the screening node [that] is unique to that screening node;
        (iii) each of the two or more skill nodes is associated with (A) a score range and (B) three or more response actions that correspond to sections of the score range; and
        (iv) each of the three or more response actions is associated with a sub-skill from among a plurality of sub-skills;
    (c) a user interface configured to be displayed to a user device of an educator;
    (d) a database configured to store:
        (i) a set of school data comprising a set of students and a set of classes, and
        (ii) a plurality of problem types, wherein each of the plurality of problem types is associated with one of the plurality of sub-skills or one of the plurality of general skills;
    wherein the one or more processors are configured to:
        (i) for each of the set of students and each of the set of classes, maintain a current location that identifies a node or a response action where that student or that class is located on the data structure,
        (ii) on a repeating time interval, produce a custom assessment for that student or that class by:
            (A) selecting a set of assessment problem types from the plurality of problem types based on the general skill or the sub-skill associated with the current location corresponding to the one of the plurality of sub-skills or one of the plurality of general skills, and
            (B) automatically creating a set of custom assessment problems based on the set of assessment problem types and a random generation of integers,
        (iii) receive a result score for the custom assessment, and
        (iv) traverse that student or that class to a subsequent node or a subsequent response action based on the result score and the score range of the current location, and then update the current location prior to the next repeating time interval.

2. The guided learning system of claim 1, wherein the two or more skill nodes are sequentially related to each other and to the origin node of those two or more skill nodes.

3. The guided learning system of claim 2, wherein the one or more processors are further configured to:
    (i) when traversing a class from the current location to the origin node, determine whether a set of individual scores for any student in that class fall within a low-range of the score range, and
    (ii) in response, traverse that student to an individual subsequent node of the data structure.

4. The guided learning system of claim 1, wherein the one or more processors are further configured to, on the repeating time interval, produce an instructional script for that student or that class based on the general skill or the sub-skill associated with the current location, wherein the instructional script comprises text that may be read aloud to provide instruction on the general skill or the sub-skill.

5. The guided learning system of claim 4, wherein the one or more processors are further configured to:
    (i) identify, from a plurality of printing devices, a printing device that is associated with the educator of that student or that class for which the instructional script and the custom assessment are produced, and
    (ii) cause the printing device to produce physical copies of the instructional script and the custom assessment.

6. The guided learning system of claim 1, wherein:
    (i) the score range comprises a low-range, a mid-range, and a high-range,
    (ii) a first response action of the three or more response actions that corresponds to the high-range includes automatic production of a follow-up custom assessment for a subsequent sub-skill and traversal to the subsequent node away from the origin node that is associated with the subsequent sub-skill,
    (iii) a second response action of the three or more response actions that corresponds to the mid-range includes automatic production of:
        (A) a fluency building instructional script for the sub-skill,
        (B) the custom assessment based on the sub-skill, and
        (C) a general skill assessment based on the general skill, and
    (iv) a third response action of the three or more response actions that corresponds to the low-range includes automatic production of:
        (A) an acquisition instructional script for a prior sub-skill,
        (B) the custom assessment based on the prior sub-skill, and
        (C) the general skill assessment based on the general skill.

7. The guided learning system of claim 1, wherein the user interface comprises an intervention interface that includes:
    (a) a graph that shows received result scores for one or more students in a repeating time interval,
    (b) a result score submission area configured to receive result scores for the one or more students for each repeating time interval, and
    (c) an intervention timeline that is based on the data structure and that shows at least the current node, any prior traversed nodes, and any potentially traversable subsequent nodes.

8. The guided learning system of claim 1, wherein the use interface comprises an intervention grouping interface, and wherein the one or more processors are further configured to:
    (i) identify a plurality of individual students that are currently located at an individual node of the data structure instead of located at a classwide node, (ii) group the plurality of individual students into a plurality of intervention groups based on each student's classroom and current location on the data structure, and (iii) cause the intervention grouping interface to display the plurality of intervention groups.

9. The guided learning system of claim 1, wherein the user interface comprises a learning coach interface that includes a list of each class at a school that is currently located on a node of the data structure that is not an origin node, and that displays for each class in the list:

(i) a recency indicator that is based on the most recent result score received for that class, (ii) a progress indicator that is based on that class's current location on the data structure, (iii) a consistency indicator that is based on the number of the repeating time intervals that have occurred and the number of result scores received for that class, (iv) a weeks per skill indicator that is based on the average number of weeks that it takes that class to traverse one node towards the origin node, and (v) a scores increasing indicator that is based on a historic set of result scores for that class.

10. The guided learning system of claim 9, wherein the one or more processors are further configured to:

(i) determine whether an educator for a class on the list should be visited by a learning coach based on one or more of the recency indicator, the consistency indicator, and the scores increasing indicator, and (ii) cause the learning coach interface to identify the educator for the class as recommended for a visit by the learning coach.

11. A method for providing guided learning, comprising:

(a) at a server, storing a data structure comprising a plurality of screening nodes, wherein:

(i) each screening node is associated with two or more skill nodes as an origin node;

(ii) each screening node is associated with a general skill, from among a plurality of general skills, where the general skill associated with the screening node is unique to that screening node;

(iii) each of the two or more skill nodes is associated with (A) a score range and (B) three or more response actions that correspond to sections of the score range; and (iv) each of the three or more response actions is associated with a sub-skill from among a plurality of sub-skills;

(b) providing a user interface to a user device of an educator;

(c) storing a set of school data comprising a set of students and a set of classes, and a plurality of problem types, wherein each of the plurality of problem types is associated with one of the plurality of sub-skills or one of the plurality of general skills;

(d) for each of the set of students and each of the set of classes, maintaining a current location that identifies a node or a response action where that student or that class is located on the data structure;

(e) on a repeating time interval, producing a custom assessment for that student or that class by:

(i) automatically selecting a set of assessment problem types from the plurality of problem types based on the general skill or the sub-skill associated with the current location, and (ii) automatically creating a set of custom assessment problems based on the set of assessment problem types and a random generation of integers;

(f) receiving a result score for the custom assessment; and (g) traversing that student or that class to a subsequent node or a subsequent response action based on the result score and the score range of the current location, and then updating the current location prior to the next repeating time interval.

12. The method of claim 11, wherein the two or more skill nodes are sequentially related to each other and to the origin node of those two or more skill nodes.

13. The method of claim 12, further comprising:

(a) when traversing a class from the current location to the origin node, determining whether a set of individual scores for any student in that class fall within a low-range of the score range, and (b) in response, traversing that student to an individual subsequent node of the data structure.

14. The method of claim 11, further comprising, on the repeating time interval, producing an instructional script for that student or that class based on the general skill or the sub-skill associated with the current location, wherein the instructional script comprises text that may be read aloud to provide instruction on the general skill or the sub-skill.

15. The method of claim 11, wherein:

(i) the score range comprises a low-range, a mid-range, and a high-range, (ii) a first response action of the three or more response actions that corresponds to the low-range includes automatic production of a custom follow-up assessment for a subsequent sub-skill and traversal to the subsequent node away from the origin node that is associated with the subsequent sub-skill, (iii) a second response action of the three or more response actions that corresponds to the mid-range includes automatic production of:

(A) a fluency building instructional script for the sub-skill, (B) the custom assessment based on the sub-skill, and (C) a general skill assessment based on the general skill, and (iv) a third response action of the three or more response actions that corresponds to the high-range includes automatic production of:

(A) an acquisition instructional script for a prior sub-skill, (B) the custom assessment based on the prior sub-skill, and (C) the general skill assessment based on the general skill.

16. The method of claim 11, wherein the user interface comprises an intervention grouping interface, the method further comprising:

(a) identifying a plurality of individual students that are currently located at an individual node of the data structure instead of located at a classwide node;

(b) grouping the plurality of individual students into a plurality of intervention groups based on each student's classroom and current location on the data structure; and (c) causing the intervention grouping interface to display the plurality of intervention groups.

17. The method of claim 11, wherein the user interface comprises a learning coach interface that includes a list of each class at a school that is currently located on a node of the data structure that is not an origin node, and that displays for each class in the list:
- (i) a recency indicator that is based on the most recent result score received for that class,
- (ii) a progress indicator that is based on that class's current location on the data structure,
- (iii) a consistency indicator that is based on the number of the repeating time intervals that have occurred and the number of result scores received for that class,
- (iv) a weeks per skill indicator that is based on the average number of weeks that it takes that class to traverse one node towards the origin node, and
- (v) a scores increasing indicator that is based on a historic set of result scores for that class.

18. The system of claim 1, wherein the custom assessment comprises a set of randomly generated problems spaced apart and sections to show work and an answer.

* * * * *